United States Patent [19]

Frambs et al.

[11] 3,798,597

[45] Mar. 19, 1974

[54] SYSTEM AND METHOD FOR EFFECTING CYCLIC REDUNDANCY CHECKING

[75] Inventors: Terrence K. Frambs, Medway; Alejandro B. Marton, Natick, both of Mass.

[73] Assignee: Honeywell Information Systems Inc., Waltham, Mass.

[22] Filed: June 26, 1972

[21] Appl. No.: 266,014

[52] U.S. Cl. .......................................... 340/146.1 AL
[51] Int. Cl. .............................................. G06f 11/12
[58] Field of Search ............ 340/146.1 AL, 146.1 A

[56] References Cited

UNITED STATES PATENTS

| | | | |
|---|---|---|---|
| 3,573,726 | 4/1971 | Towell et al. | 340/146.1 AL |
| 3,678,469 | 7/1972 | Freeman et al. | 340/146.1 AL |

*Primary Examiner*—Charles E. Atkinson
*Attorney, Agent, or Firm*—Nicholas Prasinos; Ronald T. Reiling

[57] ABSTRACT

A system is set forth for processing binary coded information defined by bytes in a data stream in order to facilitate detecting of errors resulting from the transmission of the information. The system includes a register accumulator for receiving and storing up-dated bytes of binary data. First means for effecting modulo 2 summing is provided responsive to the application thereto of combinations of binary signals related to selected bytes in the data stream and to a segment of a byte previously stored in the accumulator so as to generate sums defining unique modifiers selection signals. These signals are applied to a memory storage means which stores a plurality of predetermined binary coded modifiers which are selectively retrievable responsive to respective unique modifier selection signals. In addition, a second means for effecting modulo 2 summing is provided responsive to retrieved modifiers and to another of the segments of the byte stored in the accumulator for generating a sum comprising an up-dated cyclic redundancy accumulation. This updated cyclic redundancy accumulation is then supplied to the accumulator and stored therein for subsequent transmission.

10 Claims, 2 Drawing Figures

PATENTED MAR 19 1974 3,798,597

SYSTEM AND METHOD FOR EFFECTING CYCLIC REDUNDANCY CHECKING

Figure 1:
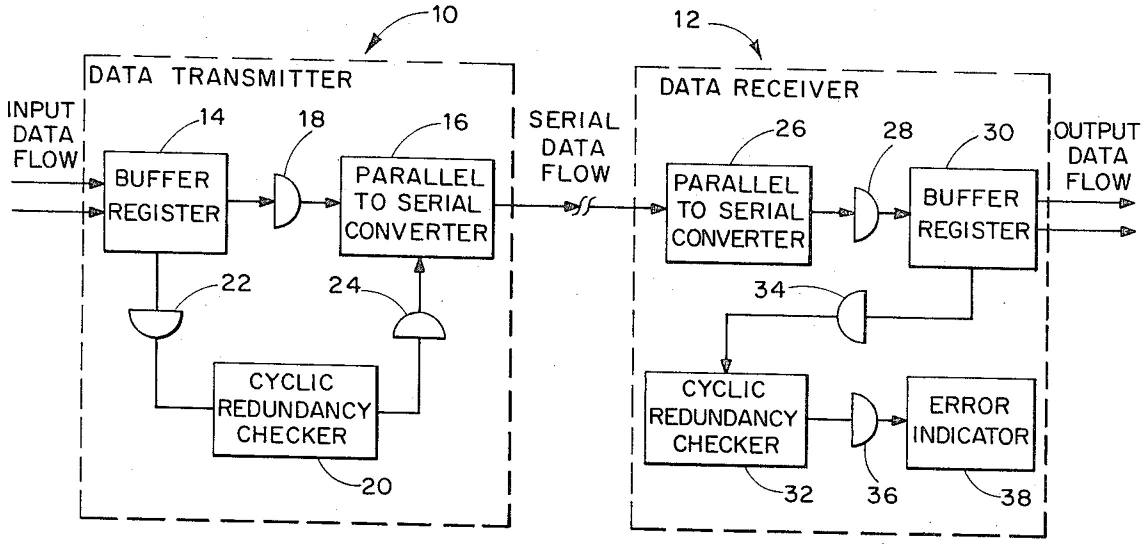

The present invention relates generally to processing binary coded information and more particularly is directed to a system and a method for processing binary coded information in order to facilitate detection of errors occurring during the transmission of such information.

In recent years as the usage of various types of data processing systems has dramatically increased, a corresponding increase has occurred in the complexity and size, as well as the expense, of such equipment. As a result techniques have been developed for locating relatively large expensive data processing equipment at suitable central locations while providing remotely located terminals for receipt of transmitted data to be processed by the central equipment. This practice has resulted in substantially reducing the expense associated with the usage of large-scale data processing systems, since a single central computing station may accommodate a plurality of remotely located terminals from which information to be processed is received and in certain instances after appropriate processing is then transmitted to the remote terminal for direct usage or other processing. However, significant problems have arisen in view of the inherent problems associated with the transmission of data between various locations. In this regard various types of electrical noise and signal degradation may occur which introduce errors into the data being transmitted. For example, the transmission process frequently carries the introduction of burst errors, which may be difficult to detect.

Various types of solutions have been suggested for detecting the occurrence of such errors and in this regard a variety of polynomial codes have been utilized for encoding information pursuant to the error detection system being utilized. Certain techniques which have met with some degree of success involve cyclic redundancy checking in which error detection is accomplished by utilizing a shift register with associated exclusive OR feed back techniques in order to effect polynomial division of the data stream by the cyclic redundancy checking shift register divisor polynomial. However, such long division techniques have presented certain problems relative to inflexibility and time consumption. The usage of cyclic codes for error detection pruposes is described in some detail in the following articles: "Cyclic Codes for Error Detection" by W. W. Peterson of D. T. Brown in Proceedings of the I.R.E., January 1961, Pages 228–235; "Polynomial Error Detecting Codes and Their Implementation" by Michael A. Liccardo of Lawrence Radiation Laboratory in Computer Design, September, 1971 pages 53–59; "Cyclic Redundancy Checking by Program" by P.E. Boudreau and R.F. Steen, in Fall Joint Computer Conference, 1971 pages 9–15; "A multi-channel CRC register" by Arvind M. Patel, Spring Joint Computer Conference, 1971 pages 11–14; "A Universal Cyclic Division Circuit" by A.W. Maholick and R.B. Freeman, Fall Joint Computer Conference, Nov. 16–18, 1971, pages 1–8; "A Cyclic Redundancy Checking (CRC) Algorithm" by A.B. Marton and T.K. Frambs in the Honeywell Computer Journal, Volume 5, Number 3, 1971 pages 140–142.

Accordingly, it is an object of the present invention to provide an improved system for processing binary coded information.

It is another object of the present invention to provide an improved system for processing binary coded information in a data stream to facilitate detection of errors which arise during the transmission of the information.

It is a further object of the present invention to provide an improved method and system for use in the detection of errors resulting from the transmission of binary coded information utilizing cyclic redundancy checking techniques.

Figure 2:
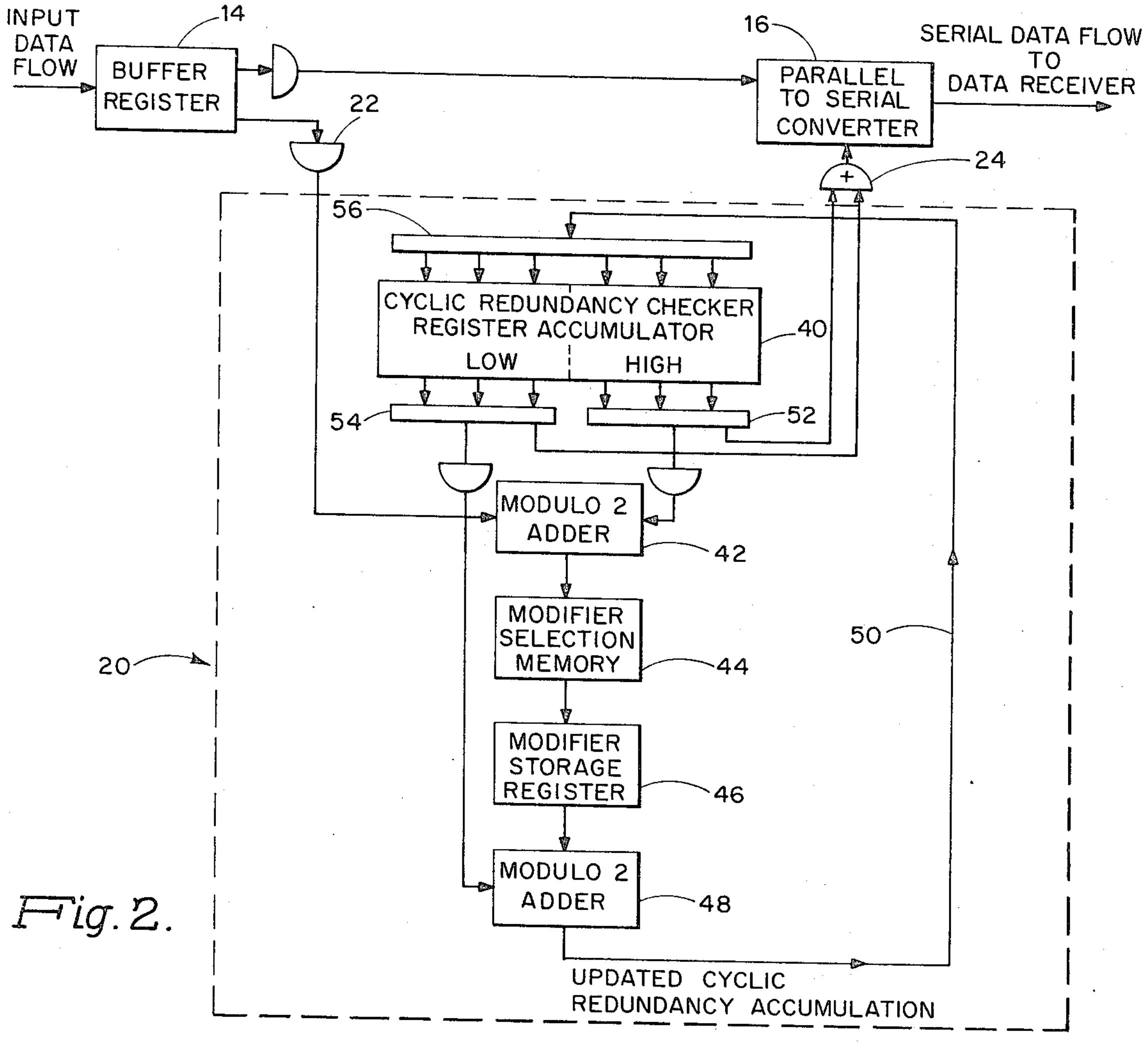

Various additional objects and advantages of the present invention will become readily apparent from the following detailed description and accompanying drawings wherein:

FIG. 1 is a block diagram which diagramatically illustrates a typical system for transmitting data between remote locations and incorporating a system in accordance with the present invention; and FIG. 2 is a block diagram illustrating additional details of a system in accordance with the present invention for effecting cyclic redundancy checking in order to facilitate error detection.

Referring generally to the drawings and initially to FIG. 1, a system for processing binary coded information is diagramatically illustrated. As shown, a plurality of parallel data inputs are coupled to a data transmitter 10 which functions to serialize the input data and to transmit data to a remotely located data receiver 12. The data receiver 12 receives the data and converts the serialized data flow to plural parallel outputs which then may be supplied to other associated equipment (not shown). It should be noted, of course, that if desired serial input and output data flow may be employed.

More particularly, the input data flow to the data transmitter is initially supplied to a suitable buffer register 14 having its output coupled to a parallel to serial converter 16 through appropriate logic gating circuitry 18. The parallel to serial converter 16 functions to serialize the parallel data in a well known manner to facilitate the transmission of the data flow, to the data receiver 12, which may for example be positioned at a remote terminal. In addition, in accordance with the principles of the present invention the buffer register 14 is also coupled to a cyclic redundancy checker 20, which is illustrated and described in detail hereinafter, through a suitable logic gating means 22, while the output from the cyclic redundancy checker 20 is then periodically applied to the parallel to serial converter 16 through another logic gating means 24 at appropriate time intervals. In operation the output from the cyclic redundancy checker 20, which comprises an up-dated cyclic redundancy accumulation, as will be further described hereinafter, may be transmitted to the data receiver with the serialized data flow in order to permit the effectuation of cyclic redundancy checking for purposes of detecting errors resulting from the data transmission. At the data receiver 12 the serialized data flow, which includes the signal from the parallel to serial converter 16 and the up-dated cyclic redundancy accumulation is applied to a serial to parallel converter 26. The output from the serial to parallel converter 26 is in turn supplied through suitable logic gating means 28 to a buffer register 30, which then supplies the output data flow. In addition, the buffer register 30 is also coupled to another cyclic redundancy checker 32 similar to the cyclic redundancy checker 20 through another logic gating circuit 34. The logic gating means 34 is arranged to couple the up-dated cyclic redundancy accumulation supplied from the cyclic redundancy checker 20 to the cyclic redundancy checker 32 to permit a comparison to be made between the previous accumulation in the cyclic redundancy checker 32 and the up-dated cyclic redundancy accumulation. In the event the transmission of data is error free the cyclic redundancy checker 32 is cleared. However, in the event an error has occurred the checker 32 is not cleared by the up-dated accumulation and an output signal is supplied from the cyclic redundancy checker 32 to a suitable error indicator 34, which is coupled to the cyclic redundancy checker 32 through another suitable logic gating means 36. The error indicator 34 may comprise a suitable visual or audio indicator such as a warning light, a buzzer, etc., or it may be suitably coupled to other associated control equipment for effecting a halt in the operation of the data transmission procedure in order to permit correction of the error to be effected. Alternatively, if desired, the error indicator 34 may be coupled to a suitable error retry or error correction systems, depending upon the desired mode of operation.

In the embodiment illustrated in FIG. 1 the buffer registers, as well as the parallel to serial converter and serial to parallel converter and the various logic gating circuits all preferably comprise conventional devices. However, the particular cyclic redundancy checker 20 for producing an up-dated cyclic redundancy accumulation and the transmission thereof to the cyclic redundancy checker 32 for purposes of comparison with the previous accumulation stored therein as an indication of the presence or absence of errors in the transmission of the information flow comprise unique arrangements. The particular arrangement of the cyclic redundancy checker 20 and its mode of operation is described in detail in FIG. 2. Since the cyclic redundancy checker 32 provided in the data receiver 12 is essentially identical to the cyclic redundancy checker 20, the cyclic redundancy checker 32 is not shown and described in detail.

Referring now to FIG. 2, the cyclic redundancy checker system 20 is shown coupled to the buffer register 14 through the logic gating means 22, as well as the coupling thereof to the parallel to serial converter 16 through the logic gating means 24. More particularly, the cyclic redundancy checking system 20 is particularly adapted for use in a system for processing binary coded information defined by a plurality of bytes in a data stream. The cyclic redundancy checking system 20 includes a register accumulator 40 having a plurality of data storage positions illustrated as a set of low order positions and a set of high order positions for storing segments of a byte of binary coded information which is supplied thereto.

A first means 42 is provided for effecting modulo 2 summing and is adapted to operate in response to the substantially simultaneous application thereto of a combination of binary signals including an augend signal associated with a selected byte in the input data stream and an addend signal associated with segments of a byte previously stored in the register accumulator 40. The modulo 2 summing means 42 is adapted to generate sums which comprise unique modifier selection signals responsive to selected combinations of binary signals applied thereto. These unique modifier selection signals are in turn applied to a memory storage means 44 which stores a plurality of predetermined binary coded modifiers, the derivation of which is subsequently explained in detail. The predetermined modifiers stored therein are selectively retrievable responsive to the application of respective unique modifier selection signals to the memory storage means 44. A modifier storage register 46 may be provided, comprising a suitable buffer register, for receiving and selectively storing the predetermined modifiers supplied from the memory storage means 44 and applying these modifiers to one of the inputs of a second means 48 for effecting modulo 2 summing. Alternatively, in certain instances, the predetermined modifiers may be directly applied to one of the inputs of the second modulo 2 summing means 48. The second modulo 2 summing means is arranged to operate responsive to the retrieval of one of the predetermined modifiers which defines another addend signal applied thereto, while another augend signal functioning as the other input to the second modulo 2 summing means 48 is defined by another segment of the byte previously stored in the register accumulator 40. Thus, the second modulo 2 summing means 48 effects a summing operation responsive to the simultaneous application thereto of the above described pair of signals respectively from the memory storage means and from the register accumulator, thereby generating a sum which comprises an up-dated cyclic redundancy accumulation. This up-dated cyclic redundancy accumulation comprises a binary coded signal which is supplied through a conductor 50 to the input of the register accumulator 40 and is stored therein for subsequent transmission upon the enabling of the logic gating means 24 to the parallel to serial converter 16 and then to the data receiver 12, where the accumulation is subsequently compared with a previous accumulation in the cyclic redundancy checker 32 for purposes of ascertaining whether an information transmission error has occurred.

The register accumulator 40, as previously mentioned, is functionally divided into low order and high order positions for respectively storing the segments of a byte of information applied thereto in binary form. The register configuration is defined by the degree of the encoding polynomial which is utilized for encoding the information being applied thereto. For example, if an encoding polynomial of the sixteenth degree is utilized for encoding purposes, then sixteen data storage positions are required in the register, divided into eight low order positions and eight high order positions for storing the byte of information. In accordance with the principles of the present invention any convenient encoding polynomial may be utilized with a corresponding register accumulator being employed. As shown, the high order positions of the register accumulator 40 are coupled to the input of the first modulo 2 adder 42 through a suitable output bus 52, which thereby supplies an addend signal associated with each of the high order segments of the byte stored in the register accumulator to the first modulo 2 adder 42. As this high order segment is moved out of the high order position of the register accumulator 40, the register accumulator is in a condition for receiving a new accumulation of data in this position. Similarly, an output bus 54 is provided coupled to each of the low order positions of the register and to the second modulo 2 adder 48. Accordingly, when the low order segment of the byte has been moved out of the register accumulator 40 into the modulo 2 adder 48, the register accumulator 40 is in a condition for receiving a new accumulation of data and to store this new accumulation, pending its transmission to the data receiver. The augend signal which is applied to the first modulo 2 adder 42 is systematically related to and associated with a selected byte in the data stream, and is applied to the first modulo 2 adder 42 upon enabling of the gate 22. The simultaneous application of these two signals to the modulo 2 adder 42 results in the generation of a sum which comprises a unique modifier selection signal associated with the particular combination of signals defined by the previous accumulation stored in the high order position of the register accumulator 40 and the byte in the data stream. Thus, it may be seen that the sum applied to the modifier selection memory 44 is unique depending upon the particular combination of signals applied to the first modulo 2 adder, and in turn results in the retrieval of one of the predetermined modifiers stored in the modifier selection memory 44.

The modifier selection memory 44 may comprise a suitable read-only memory which is adapted to store a plurality of the precalculated modifiers or alternatively it may comprise a suitable read-write memory so that additional or different modifiers may be readily stored therein.

The manner of precalculating the predetermined modifiers which are stored in the memory 44 will now be described in detail, and an illustrative example is provided assuming that a register accumulator is employed having sixteen bit storage positions and divided into eight low order and eight high order segments. More particularly, a suitable modifier may be precalculated for each one of the 256 possible eight bit binary combinations comprising a segment. However, for purposes of simplification eight modifiers may be precalculated for the eight single bit configurations of a vector character defined by [A] which results from half-adding the data character to the high order segment of the previous accumulation in the register accumulator 40 disregarding all feedback effects. If the term [A] equals 1000 000 and is right-justified in a 16 bit register and the register contents are shifted to the right, zeros will appear at the output for seven shift times. But on the eighth shift time since a 1 will appear, the polynomial which defines the configuration of the register accumulator is half added to the register's current contents so that the register accumulator polynomial comprises the 16 bit modifier for [A] equals 1000 0000 which may be referred to as M1. (Half adders are well known in the computer art, and are described on pages 154–156 of a book entitled "Digital Computer Fundamentals" by Thomas C. Bartee and published in 1960 by McGraw Hill Book Company). Similarly, when the term [A] equals 0100 0000, zeros will appear for only six shifts, and on the seventh shift the register accumulator polynomial again appears in the register which is then shifted one more time (eight shift). If a one appears at the output, the polynomial is again half added to the current contents in the register to define the second modifier, M2. In addition, it may be seen that this second modifier, M2, also may be obtained by shifting the previous modifier M1 one position to the right and half adding the register accumulator polynomial only if a one appears at the output. In this manner M2 may be utilized to generate M3 etc. Table 1 set forth below lists all of the eight possible single bit components of any eight bit [A] character and their corresponding modifiers for a specific example of a typical 16 bit register polynomial in which the coefficients of the various terms of the register polynomial define the presence of a 1 or a 0 in the appropriate position. It may be further noted from the Table 1 that the feedback modifier for any eight bit [A] character may be constructed by half-adding together the appropriate modifiers corresponding to the component bit positions of the [A] term. For example, the feedback modifier for [A] equals 1001, 0110 would be calculated by determining the sum of M1 since a 1 is in the first position, M4, since a 1 is in the fourth position, M6 since a 1 is in the sixth position and M7 since a 1 appears in the seventh position.

TABLE 1

BASIC MODIFIER SET CONFIGURATION FOR $$P(x)=1+x+x^2+x^4+x^7+x^{13}+x^{15}+x^{16}$$

| [A] | [M] |
|---|---|
| 1000 0000 | M1 = 1110 1001 0000 0101 |
| 0100 0000 | M2 = 1001 1101 1000 0111 |
| 0010 0000 | M3 = 1010 0111 1100 0110 |
| 0001 0000 | M4 = 0101 0011 1110 0011 |
| 0000 1000 | M5 = 1100 0000 1111 0100 |
| 0000 0100 | M6 = 0110 0000 0111 1010 |
| 0000 0010 | M7 = 0011 0000 0011 1101 |
| 0000 0001 | M8 = 1111 0001 0001 1011 |

To summarize the derivation of the various modifiers, M, terms it may be seen that M1 is derived directly from the coefficients of the terms of the polynomial P(x). M2 is derived by merely shifting M1 one position to the right and if a one appears at the output, half adding the register accumulator polynomial term to M1, M3 is derived by shifting the M2 term one position to the right and if a one appears at the output, half adding the register accumulator polynomial to M1, etc.

Thus, it may be seen that the sum which appears at the output of the first means 42 for effecting modulo 2 summing may be identified as a respective [A] character which in turn is adapted to effect retrieval of one or a set of the predetermined modifiers [M] from the memory storage means 44. The retrieved modifier is then applied to the input of the second modulo 2 adder 48 together with the previous low order segment of the byte stored in the register accumulator 40 via the bus 54 to facilitate simultaneous application of all of the low order bytes to the second modulo 2 adder 48. The sum generated at the output of the second modulo 2 adder 48, which defines the up-dated cyclic redundancy accumulation, is then supplied to the register accumulator 40, as previously described. In addition, as shown, the register accumulator 40 is provided with an input data bus 56 so that the up-dated cyclic redundancy accumulation may be applied to all positions in the register substantially simultaneously.

Thus, the method in accordance with the present invention may be briefly summarized. Summing is effected in accordance with modulo 2 addition of a combination of binary signals including an augend signal associated with a selected byte in the data stream and an addend signal associated with a high order segment of a byte previously stored in the register accumulator 40. In a preferred embodiment the augend signal is associated with a selected byte in the data stream which appears at or adjacent to the termination of a block of data being transmitted. The summing operation effected by the first modulo 2 adder 42 generates a unique modifier selection signal responsive to the particular combination of augend and addend signals, this signal then being applied to the modifier selection memory 44 so as to effect retrieval of a predetermined binary coded modifier previously stored in the memory 44. Subsequent modulo 2 summing is effected by the second modulo 2 adder 48 responsive to another addend signal defined by the predetermined binary coded modifier retrieved from the memory 44 and another augend signal which is defined by the other segment of the byte stored in the register accumulator 40, i.e. the low order segment. As a result of this subsequent summing operation a sum is produced comprising an up-dated redundancy accumulation which is supplied to the input bus 56 and thence to the appropriate bit storage positions in the register accumulator 42 to effect storage therein of the up-dated cyclic redundancy accumulation. This up-dated cyclic redundancy accumulation is then transmitted to the parallel to serial converter 16 upon the enabling of the logic gate 24 and is transmitted with the serialized data flow to the data receiver 12 for corresponding processing in the cyclic redundancy checker 32 to ascertain the presence or absence of errors occurring during the transmission of the binary coded information.

Accordingly, in view of the foregoing a unique system and method have been set forth and described in detail for processing binary coded information in order to facilitate the detection of errors resulting from the transmission of the information.

Various changes and modifications in the above described system and method will be readily apparent to those skilled in the art and are deemed to be within the spirit scope of the present invention as set forth in the appended claims.

We claim:

1. In a system for processing binary coded information defined by bytes in a data stream comprising:

a register accumulator adapted to receive and store updated bytes of binary data supplied thereto, said register accumulator including a set of low order positions for storing a segment of a byte and a set of high order positions for storing another segment of the byte, first means for effecting modulo 2 summing responsive to the substantially simultaneous application thereto of combinations of binary signals respectively systematically related to a selected byte in the data stream and to one of the segments of the byte stored in said accumulator, said first means being adapted to generate sums comprising unique modifier selection signals responsive to selected combinations of said binary signals, memory storage means for storing a plurality of predetermined binary coded modifiers, said predetermined modifiers being selectively retrievable responsive to the application of respective unique modifier selection signals to said memory storage means, second means for effecting modulo 2 summing responsive to the substantially simultaneous application thereto of one of said modifiers retrieved from said memory storage means and to the other of the segments of the byte stored in said accumulator, said second means being adapted to generate sums comprising updated cyclic redundancy accumulations, and means for supplying said updated cyclic redundancy accumulations to said register accumulator to effect storage therein of said updated cyclic redundancy accumulation.

2. In a system in accordance with claim 1 wherein said memory storage means is adapted to store a plurality of predetermined modifiers, each associated with one of the unique modifier selection signals determined in part from high order positions of said register accumulator.

3. In a system in accordance with claim 2 wherein said register accumulator is defined by a preselected coding polynomial and has a predetermined number of data storage positions corresponding to the degree of said preselected coding polynomial.

4. In a system in accordance with claim 1 wherein said first means for effecting modulo 2 summing is adapted to receive a combination of binary signals comprising a byte of binary data adjacent one end of a block of data and the high order segment of a previously accumulated byte of binary data stored in said register accumulator.

5. In a system in accordance with claim 4 wherein said second means for effecting modulo 2 summing is adapted to receive a combination of binary signals including the low order segment of a previously accumulated byte of binary data stored in said register accumulator.

6. A method for processing binary coded information defined by bytes in a data stream to permit detection of errors arising during the transmission of the information comprising the steps of:

summing in accordance with modulo 2 addition a combination of binary signals including an augend signal associated with a selected byte in the data stream and an addend signal associated with a segment of a byte stored in a register accumulator which selectively stores segments of bytes of binary data in low order and in high order positions, said summing generating unique modifier selection signals responsive to selected combinations of augend signals and addend signals, retrieving predetermined binary coded modifiers from a storage means responsive to respective unique modifier selection signals, subsequently summing in accordance with modulo 2 addition responsive to the substantially simultaneous generation of another addend signal defined by one of said retrieved binary coded modifiers and another augend signal defined by another segment of the byte stored in the register accumulator, said subsequent summing producing a sum comprising an updated cyclic redundancy accumulation, and applying said updated cyclic redundancy accumulation to the register accumulator to effect storage of said updated cyclic redundancy accumulation therein, whereby transmission of said updated cyclic redundancy accumulation produces indications responsive to the occurrence of errors during transmission of the information.

7. A method in accordance with claim 6 wherein a plurality of said binary coded modifiers are stored in said storage means corresponding to the high order positions of the register accumulator, said modifiers being retrievable responsive to the application to said storage means of associated ones of said unique modifier selection signals.

8. A method in accordance with claim 6 wherein said summing in accordance with modulo 2 addition of the combination of binary signals is effected adjacent one end of the transmission of a block of binary coded information.

9. A method in accordance with claim 8 wherein said addend signal is associated with a segment of a byte stored in the high order position of the register accumulator.

10. A method in accordance with claim 6 wherein during said subsequent summing in accordance with modulo 2 addition said another augend is defined by a segment of the byte stored in the low order position in the register accumulator.

* * * * *